(12) United States Patent
Rao et al.

(10) Patent No.: US 11,621,952 B2
(45) Date of Patent: Apr. 4, 2023

(54) REMOTE LOGIN PROCESSING METHOD, APPARATUS, DEVICE AND STORAGE MEDIUM FOR UNMANNED VEHICLE

(71) Applicant: APOLLO INTELLIGENT DRIVING TECHNOLOGY (BEIJING) CO., LTD., Beijing (CN)

(72) Inventors: Wenlong Rao, Beijing (CN); Yan Feng, Beijing (CN); Xuan Huang, Beijing (CN); Wei Gong, Beijing (CN); Gaifan Li, Beijing (CN); Yingnan Liu, Beijing (CN); Yue Wang, Beijing (CN); Jingjing Xue, Beijing (CN)

(73) Assignee: APOLLO INTELLIGENT DRIVING TECHNOLOGY (BEIJING) CO., LTD.

( * ) Notice: Subject to any disclaimer, the term of this patent is extended or adjusted under 35 U.S.C. 154(b) by 295 days.

(21) Appl. No.: 17/004,301

(22) Filed: Aug. 27, 2020

(65) Prior Publication Data
US 2021/0119988 A1   Apr. 22, 2021

(30) Foreign Application Priority Data
Oct. 17, 2019   (CN) .......................... 201910990404.2

(51) Int. Cl.
*H04L 9/40* (2022.01)
*H04W 12/06* (2021.01)
(Continued)

(52) U.S. Cl.
CPC .......... *H04L 63/083* (2013.01); *H04W 12/06* (2013.01); *B60R 25/246* (2013.01); *H04B 7/18504* (2013.01)

(58) Field of Classification Search
CPC . G06F 21/31-44; H04L 63/083; H04W 12/06
See application file for complete search history.

(56) References Cited

U.S. PATENT DOCUMENTS

| 5,757,916 A | * | 5/1998 | MacDoran | ............ | G01S 19/215 380/258 |
| 8,970,400 B2 | * | 3/2015 | Verna | ...................... | H04W 4/14 340/945 |

(Continued)

FOREIGN PATENT DOCUMENTS

| CN | 103001973 A | 3/2013 |
| CN | 104168261 A | 11/2014 |

(Continued)

OTHER PUBLICATIONS

N. Saxena and B. J. Choi, "Authentication Scheme for Flexible Charging and Discharging of Mobile Vehicles in the V2G Networks," in IEEE Transactions on Information Forensics and Security, vol. 11, No. 7, pp. 1438-1452, Jul. 2016. (Year: 2016).*

(Continued)

*Primary Examiner* — Kari L Schmidt
(74) *Attorney, Agent, or Firm* — Dilworth IP, LLC

(57) ABSTRACT

The present disclosure discloses a remote login processing method, apparatus, device and storage medium for an unmanned vehicle, and relates to the technical field of remote control. The implementation method of the specific method includes: sending a login request to an unmanned vehicle terminal through a first communication channel in response to a the login request received from an operator, and waiting to receive a reply instruction returned by the unmanned vehicle terminal; returning the reply instruction to the operator through the second communication channel in response to the reply instruction received from the unmanned vehicle terminal, so that the operator logs in the unmanned vehicle terminal according to the reply instruction, where there is a persistent connection state that unidirectionally authenticated between the second communication channel and the unmanned vehicle terminal.

17 Claims, 4 Drawing Sheets

---

Sending a login request to an unmanned vehicle terminal through a first communication channel in response to the login request received from an operator, and waiting to receive a reply instruction returned by the unmanned vehicle terminal — 101

Returning the reply instruction to the operator through a second communication channel in response to the reply instruction received from the unmanned vehicle terminal, so that the operator logs in the unmanned vehicle terminal according to the reply instruction, wherein there is a persistent connection state that unidirectionally authenticated between the second communication channel and the unmanned vehicle terminal — 102

(51) Int. Cl.
*B60R 25/24* (2013.01)
*H04B 7/185* (2006.01)

(56) References Cited

U.S. PATENT DOCUMENTS

| | | | | |
|---|---|---|---|---|
| 9,545,995 | B1* | 1/2017 | Chau | G05D 1/0022 |
| 10,284,560 | B2* | 5/2019 | Manley | H04L 63/10 |
| 10,466,698 | B1* | 11/2019 | Valasek | G05D 1/0061 |
| 10,891,686 | B1* | 1/2021 | Rao | G06Q 40/08 |
| 11,066,164 | B1* | 7/2021 | Tsong | H04L 63/0823 |
| 11,196,742 | B2* | 12/2021 | Cai | H04L 9/32 |
| 2005/0216144 | A1 | 9/2005 | Baldassa | |
| 2009/0125997 | A1* | 5/2009 | Cook | G06F 21/34 726/6 |
| 2009/0172801 | A1* | 7/2009 | Friedrich | H04L 67/56 726/12 |
| 2009/0276829 | A1* | 11/2009 | Sela | H04L 9/0838 711/E12.001 |
| 2010/0263033 | A1* | 10/2010 | Rangoni | H04L 63/0869 726/7 |
| 2011/0251868 | A1 | 10/2011 | Mikurak | |
| 2012/0149302 | A1* | 6/2012 | Sekiya | H04L 63/0492 455/41.1 |
| 2014/0006562 | A1* | 1/2014 | Handa | H04L 67/02 709/219 |
| 2014/0237372 | A1* | 8/2014 | Mraz | H04L 67/125 715/734 |
| 2015/0317493 | A1* | 11/2015 | Florez | G06F 21/6218 713/155 |
| 2016/0255067 | A1* | 9/2016 | Keromytis | H04L 63/0807 726/7 |
| 2016/0292696 | A1* | 10/2016 | Gong | G06Q 30/018 |
| 2017/0034149 | A1* | 2/2017 | Kang | H04W 76/10 |
| 2017/0054725 | A1* | 2/2017 | Manley | H04W 12/068 |
| 2017/0085381 | A1* | 3/2017 | Richardson | H04W 12/069 |
| 2017/0195339 | A1* | 7/2017 | Brown | H04W 4/80 |
| 2017/0269940 | A1* | 9/2017 | Valasek | H04L 9/0822 |
| 2017/0277196 | A1* | 9/2017 | Nakamura | G05D 1/0274 |
| 2017/0324739 | A1 | 11/2017 | Smith et al. | |
| 2018/0014162 | A1* | 1/2018 | Zavesky | G05D 1/102 |
| 2018/0247037 | A1* | 8/2018 | Weller | G06F 21/32 |
| 2018/0253092 | A1* | 9/2018 | Trapero Esteban | B64C 39/024 |
| 2018/0351941 | A1* | 12/2018 | Chhabra | H04L 9/38 |
| 2020/0301448 | A1* | 9/2020 | Di Benedetto | B64C 39/024 |

FOREIGN PATENT DOCUMENTS

| | | |
|---|---|---|
| CN | 106161586 A | 11/2016 |
| CN | 106254560 A | 12/2016 |
| CN | 106846010 A | 6/2017 |
| CN | 108347450 A | 7/2018 |
| CN | 108449321 A | 8/2018 |
| JP | 2015049781 A | 3/2015 |
| WO | 2018035609 A1 | 3/2018 |

OTHER PUBLICATIONS

R. Lu, L. Zhang, J. Ni and Y. Fang, "5G Vehicle-to-Everything Services: Gearing Up for Security and Privacy," in Proceedings of the IEEE, vol. 108, No. 2, pp. 373-389, Feb. 2020. (Year: 2020).*
A. Lopez, A. V. Malawade, M. A. Al Faruque, S. Boddupalli and S. Ray, "Security of Emergent Automotive Systems: A Tutorial Introduction and Perspectives on Practice," in IEEE Design & Test, vol. 36, No. 6, pp. 10-38, Dec. 2019. (Year: 2019).*
M. Wazid, A. K. Das, N. Kumar, A. V. Vasilakos and J. J. P. C. Rodrigues, "Design and Analysis of Secure Lightweight Remote User Authentication and Key Agreement Scheme in Internet of Drones Deployment," in IEEE Internet of Things Journal, vol. 6, No. 2, pp. 3572-3584, Apr. 2019. (Year: 2019).*
http://www.ipa.go.jp/security/fy14/reports/authentication/authentication2002.pdf, Mar. 2003, pp. 13-18.
First Office Action in JP Patent Application No. 2020120121 dated Sep. 7, 2021.
First Office Action in CN Patent Application No. 201910990404.2 dated Dec. 2, 2021.

* cited by examiner

REMOTE LOGIN PROCESSING METHOD, APPARATUS, DEVICE AND STORAGE MEDIUM FOR UNMANNED VEHICLE

CROSS-REFERENCE TO RELATED APPLICATION

This application claims priority to Chinese Patent Application No. 201910990404.2, filed on Oct. 17, 2019, which is hereby incorporated by reference in its entirety.

TECHNICAL FIELD

The present disclosure relates to the field of remote control technology and, in particular, to a remote login processing method, apparatus, device and storage medium for an unmanned vehicle.

BACKGROUND

With the rapid development of artificial intelligence technologies, unmanned vehicles that may be derived autonomously have been promoted and applied in a large extend. Since variable and unexpected driving environment and a restricted intelligentized level currently, the unmanned vehicles are prone to have failure conditions during driving, therefore an unmanned vehicle with a failure should be checked by an operator to determine a failure cause.

In the related technologies, the operator needs to determine an IP address of the unmanned vehicle through complicated technical solutions, to remote log in the unmanned vehicle with a failure through a server, and to determine the failure cause by checking the unmanned vehicle with failures.

However, the randomness of the IP address of the unmanned vehicle makes it difficult to determine the IP address of the unmanned vehicle and resulting in a longer time for remote login of the unmanned vehicle, a complex login procedure, thereby resulting in high time and economic cost for checking the failure of the unmanned vehicle, it is not conducive to a safe operation of the unmanned vehicles.

SUMMARY

Embodiments of the present disclosure provides a remote login processing method, apparatus, device and a storage medium for an unmanned vehicle, which is used for solving a technical problem of long time for remote login of the unmanned vehicle and a complicated login procedure in the prior art.

In a first aspect, the present disclosure provides a remote login processing method for an unmanned vehicle, the method is applied in a remote login control platform, including:

sending a login request to an unmanned vehicle terminal through a first communication channel in response to the login request received from an operator, and waiting to receive a reply instruction returned by the unmanned vehicle terminal; and returning the reply instruction to the operator through a second communication channel in response to the reply instruction received from the unmanned vehicle terminal, so that the operator may log in the unmanned vehicle terminal according to the reply instruction, where there is a persistent connection state that unidirectionally authenticated between the second communication channel and the unmanned vehicle terminal.

The persistent connection state that unidirectionally authenticated is kept between the second communication channel and the unmanned vehicle terminal, when the unmanned vehicle terminal returns the reply instruction to the remote login control platform, the unmanned vehicle terminal acts as a client to check whether the certificate with the second communication channel is legal, and transmits the reply instruction after determining the certificate is legal; the operator may remotely log in the unmanned vehicle terminal according to the received reply instruction without utilizing a complicated technical solution to determine a vehicle IP address of the unmanned vehicle, which reduces technical difficulties of the remote login of the unmanned vehicle and simplifies a login procedure of the unmanned vehicle effectively.

Further, sending a login request to the unmanned vehicle terminal through a first communication channel in response to the login request received from an operator, includes:

sending the login request to the unmanned vehicle terminal through a first relay unit in response to the login request received from the operator, where there is the persistent connection state that bidirectionally authenticated between the first relay unit and the unmanned vehicle terminal.

The persistent connection state that bidirectionally authenticated is kept between the first relay unit and the unmanned vehicle terminal, before receiving the login request, the unmanned vehicle terminal acts as a server to check whether the certificate with the first relay unit is legal, and receives the login request transmitted by the first relay unit after determining the certificate is legal, which implements a safety and reliable data transmission, and provides an implementation basis for returning the reply instruction by the unmanned vehicle terminal subsequently.

Further, a persistent connection open state is kept between the first relay unit and the unmanned vehicle terminal.

The persistent connection open state kept between the first relay unit and the unmanned vehicle terminal is conducive to the normal and timely acquisition of the operator's login request by the unmanned vehicle terminal, and the efficiency of the remote login of the unmanned vehicle.

Further, waiting to receive the reply instruction returned by the unmanned vehicle terminal, includes:

waiting to receive a random code of an Internet protocol (IP) port returned by the unmanned vehicle terminal;

where the returning the reply instruction to the operator through the second communication channel in response to the reply instruction received from the unmanned vehicle terminal, includes:

generating, according to the received random code of the IP port, a login password through the second communication channel and returning the login password to the operator.

Receiving the random code of the IP port of the unmanned vehicle terminal and generating, according to the random code of the IP port, the login password by using the second communication channel that authenticated, the vehicle IP address of the unmanned vehicle is determined without utilizing the complicated technology, which reduces the technical difficulties of the remote login of the unmanned vehicle, and is conducive to reduce the economic and time costs for checking the unmanned vehicle with a failure.

Further, receiving the random code of the IP port that returned by the unmanned vehicle terminal, includes:

receiving the random code of the IP port returned by the unmanned vehicle terminal through a second relay unit, where there is a persistent connection state that unidirectionally authenticated between the second relay unit and the unmanned vehicle terminal;

the generating, according to the received random code of the IP port, a login password through the second communication channel and returning the login password to the operator, includes:

determining, according to the received random code of the IP port, an IP address of the unmanned vehicle terminal through the second relay unit and sending the random code of the IP port and the IP address of the unmanned vehicle terminal to a third relay unit through the second relay unit;

generating, by the third relay unit, a random code according to the random code of the IP port and the IP address of the unmanned vehicle terminal and returning the random code to the operator as the login password.

The second communication channel determines IP address of the unmanned vehicle terminal according to the received random code of the IP port, and determines the random code used as the login password according to the random code of the IP port and the determined IP address, the IP address of the unmanned vehicle is determined without utilizing the complicated technical solution, which reduces the technical difficulties of the remote login of the unmanned vehicle, and is conducive to effectively control the economic and time costs for checking the unmanned vehicle with a failure.

Further, the persistent connection state between the second relay unit and the unmanned vehicle terminal includes the persistent connection open state and a persistent connection close state, the receiving the random code of the IP port returned by the unmanned vehicle terminal through a second relay terminal unit, includes:

receiving the random code of the IP port returned by the unmanned vehicle terminal through the second relay unit when there is a persistent connection open state between the second relay unit and the unmanned vehicle terminal.

The persistent connection state between the second relay unit and the unmanned vehicle terminal includes the persistent connection open state and the persistent connection close state, when the persistent connection state closes, the unmanned vehicle terminal does not return the reply instruction to the remote login control platform, which is conducive to ensure the safety and controllability of the remote login of the unmanned vehicle.

Further, the reply instruction returned by the unmanned vehicle terminal has an effective time limit, when time falls out of the effective time limit of the reply instruction, the operator cannot log in the unmanned vehicle terminal according to the reply instruction.

The reply instruction returned by the unmanned vehicle terminal has an effective time limit, when the time falls out of the effective time limit, the reply instruction is an invalid instruction, which is conducive to ensure the safety and controllability of the remote login of the unmanned vehicle.

In a second aspect, the present disclosure provides a remote login processing apparatus for an unmanned vehicle, including:

a first processing unit, configured to send a login request to an unmanned vehicle terminal through a first communication channel in response to the login request received from an operator, and wait to receive a reply instruction returned by the unmanned vehicle terminal;

a second processing unit, configured to return the reply instruction to the operator through a second communication channel in response to the reply instruction received from the unmanned vehicle terminal, so that the operator logs in the unmanned vehicle terminal according to the reply instruction, where there is a persistent connection state that unidirectionally authenticated between the second communication channel and the unmanned vehicle terminal.

Further, the first processing unit includes:

a first processing sub-unit, configured to send the login request to the unmanned vehicle terminal through a first relay unit in response to the login request received from the operator, where there is the persistent connection state that bidirectionally authenticated between the first relay unit and the unmanned vehicle terminal.

Further, a persistent connection open state is kept between the first relay unit and the unmanned vehicle terminal.

Further, the second processing unit includes:

a first receiving sub-unit, configured to receive a random code of an IP port returned by the unmanned vehicle terminal;

a second processing sub-unit, configured to generate, according to the received random code of the IP port, a login password through the second communication channel and return the login password to an operator.

Further, the first receiving sub-unit includes:

a first receiving module, configured to receive the random code of the IP port returned by the unmanned vehicle terminal through a second relay unit, where there is a persistent connection state that unidirectionally authenticated between the second relay unit and the unmanned vehicle terminal;

the second processing sub-unit includes:

a first processing module, configured to determine, according to the received random code of the IP port, an IP address of the unmanned vehicle terminal through the second relay unit and send the random code of the IP port and the IP address of the unmanned vehicle terminal to a third relay unit through the second relay unit;

a second processing module, and the third relay unit is provided in the second processing module, the third relay unit generates a random code according to the received random code of the IP port and the IP address of the unmanned vehicle terminal, and returns the random code to the operator as the login password.

Further, the persistent connection state between the second relay unit and the unmanned vehicle terminal includes the persistent connection open state and a persistent connection close state, the first receiving module, includes:

a first receiving sub-module, configured to receive the random code of the IP port returned by the unmanned vehicle terminal through the second relay unit, when there is the persistent connection open state between the second relay unit and the unmanned vehicle terminal.

In a third aspect, the present disclosure provides an electrical device, including:

at least one processor; and a memory communicatively connected to the at least one processor; where the memory stores an instruction executable by the at least one processor, so that the at least one processor executes the instruction to perform the method according to any one of the first aspect.

In a fourth aspect, the present disclosure provides a non-transitory computer-readable storage medium that stores a computer instruction, the computer instruction is configured to enable the computer to perform the method according to any one of the first aspect.

An embodiment in the present disclosure has the following advantages or beneficial effects: time for the remote login of the unmanned vehicle is short, and the login procedure is simple. Because the following technical solution is applied: sending a login request to an unmanned vehicle terminal through a first communication channel in response to the login request received from an operator, and waiting to receive a reply instruction returned by the unmanned vehicle terminal, and returning the reply instruction to the operator through a second communication channel in response to the reply instruction received from the unmanned vehicle terminal, so that the operator may log in the unmanned vehicle terminal according to the reply instruction, where there is a persistent connection state that unidirectionally authenticated between the second communication channel and the unmanned vehicle terminal, thereby the problems of long time for the remote login of the unmanned vehicle and a complicated login procedure in the related art is overcome.

Other effects of the foregoing optional manners will be described below in conjunction with specific embodiments.

BRIEF DESCRIPTION OF DRAWINGS

The drawings herein are incorporated in and constitute a part of this specification, illustrate embodiments consistent with the present disclosure, and together with the description serve to explain the principles of the present disclosure.

Figure 1:
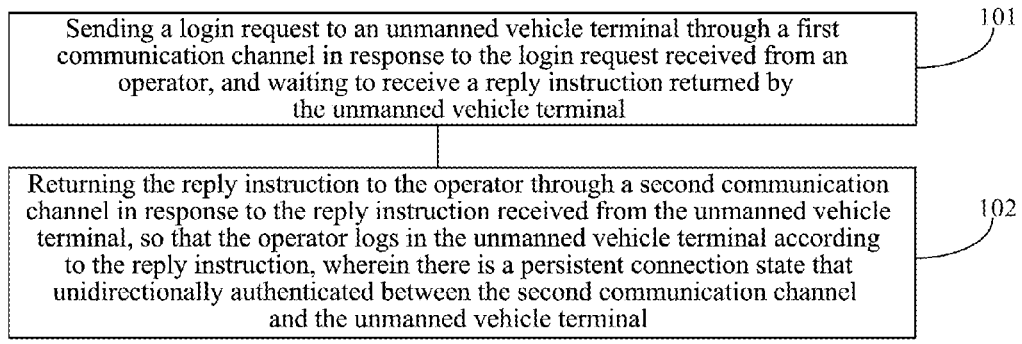
FIG. 1 is a schematic flowchart of a remote login processing method for an unmanned vehicle provided by an embodiment of the present disclosure.

Through the above drawings, a clear embodiment of the present disclosure has been shown, which will be described in more detail later. These drawings and text descriptions are not intended to limit the scope of the concept of the present disclosure in any way, but rather to explain the concept of the present disclosure to those skilled in the art by referring to specific embodiments.

DESCRIPTION OF EMBODIMENTS

Some exemplary embodiments will be described in detail herein; the examples are represented in the drawings. When the descriptions below related to the drawings, identical numbers in different drawings represent identical or similar elements unless otherwise indicated. Implementations described in the following exemplary embodiments do not represent all the embodiment in compliant with the present disclosure. On the contrary, they are merely examples of apparatus and methods consistent with some aspects of the present disclosure, as detailed in the appended claims.

Explanation of nouns related in the present disclosure:

Persistent connection state: multiple data packets may be sent continuously on one connection, if there is no data packet sent during a period that keeping the connection, a link detecting packet should be sent by two parts.

Unidirectionally authentication: the Hyper Text Transfer Protocol over Secure Socket Layer (Https) needs to handshake before building a Socket connection (a data exchange between two applications in the network may be implemented through a bidirectional communication connection).

Bidirectionally authentication: the technical principle of which is similar to the unidirectionally authentication, comparing to the unidirectionally authentication, in addition to a client-to-server certificate in which, it adds a server-to-client authentication.

IP address: Internet Protocol address, it refers to a logic address that assigned to a terminal device for Internet utilization.

Open API: Open Application Programming Interface, it refers to encapsulating service of the website into a series of open data interfaces that easy to be recognized by computers, which is applied to a third-party developer, and provides an Open API platform as an open platform.

An application scenario of the present disclosure is that: with the rapid development of artificial intelligence technologies, unmanned vehicles that may be derived autonomously have been promoted and applied in a large extend. Since variable and unexpected driving environment and a restricted intelligentized level currently, failure conditions may appear easily in the driving process of the unmanned vehicle, therefore the unmanned vehicle with failures should be checked by operators to determine a failure cause. Since the location where the unmanned vehicle makes a failure may be far away from the operator or the driving environment of the unmanned vehicle is complex and abominable, the operator cannot reach a failure site of the unmanned vehicle to check. At this time, the operator may select to remotely log in the unmanned vehicle to operate the checking. In the related technologies, the operator needs to determine the IP address of the unmanned vehicle through complicated technical solutions, to remotely log in the unmanned vehicle with a failure through a server, and to determine the failure cause by checking the unmanned vehicle with a failure.

However, the randomness of the IP address of the unmanned vehicle makes it difficult to determine the IP address of the unmanned vehicle and resulting in a longer time for remote login of the unmanned vehicle, a complex login procedure, thereby resulting in high time and economic costs for checking the failure of the unmanned vehicle, it is not conducive to a safe operation of the unmanned vehicles.

The remote login processing method, apparatus, device and the storage medium for the unmanned vehicle provided by the present disclosure intend to solve above technical problems in the prior art.

FIG. 1 is a schematic flowchart of a remote login processing method for an unmanned vehicle provided by an embodiment of the present disclosure, as shown in FIG. 1, operations include:

step 101, sending a login request to an unmanned vehicle terminal through a first communication channel, in response to the login request received from an operator, and waiting to receive a reply instruction returned by the unmanned vehicle terminal.

In the present embodiment, specifically, an executive body of the present embodiment is a terminal device, a controller, a server or other apparatus and device that is capable of performing the present embodiment. The present embodiment is described with the executive body is the terminal device applied as a remote login control platform, a application program may be set in the terminal device, then the terminal device controls the application program to execute the method provided by the present embodiment.

The unmanned vehicle sends failure message to an unmanned vehicle management system after a failure occurs during driving, then the unmanned vehicle management system informs the operator to check the unmanned vehicle with a failure to determine the failure cause after obtaining the failure message sent by the unmanned vehicle. Since the location where the unmanned vehicle with a failure may be far away from the operator, or the unmanned vehicle used for special functions, such as fire unmanned vehicles, emergency unmanned vehicles and the like has complex and abominable driving environment, the operator cannot reach a failure site of the unmanned vehicle to check. At this time, the operator may check the unmanned vehicle with a failure by remotely logging in the unmanned vehicle terminal. Unlike the fixed IP address of a computer, the IP address of the unmanned vehicle is random, which makes it difficult to determine the location of the unmanned vehicles in the network. The keypoint to implement the remote login of the unmanned vehicle is to establish a safe and reliable communication channel with the unmanned vehicle terminal whose IP address is unknown, and to transmit login request and login reply instruction through the communication channel efficiently.

The operator sends the login request through an interaction interface of a management system in the remote login control platform after receiving a failure message of the unmanned vehicle, the login request includes the identification of the unmanned vehicle, for example, the login request sent by the operator may include a vehicle ID of the unmanned vehicle. The remote login control platform sends the login request to the unmanned vehicle terminal that match the identification through the first communication channel, according to the identification of the unmanned vehicle in the login request, after receiving the login request; where, there is a persistent connection state with a bidirectional certificate between the first communication channel and the unmanned vehicle terminal. Specifically, the login request is sent to an Open API management module through the first communication channel, where the Open API management module is a module of the unmanned vehicle that provided with an data open interface and may allow a third-party access, then the Open API management module sends the obtained login request to the unmanned vehicle terminal.

Step 102, returning the reply instruction to the operator through a second communication channel in response to the reply instruction received from the unmanned vehicle terminal, so that the operator logs in the unmanned vehicle terminal according to the reply instruction, where there is a persistent connection state that unidirectionally authenticated between the second communication channel and the unmanned vehicle terminal.

The unmanned vehicle terminal returns the reply instruction to the remote login control platform if a remote login operation of the operator is permitted by the unmanned vehicle terminal after receiving the login request of the operator, and the remote login control platform returns the reply instruction to the operator through the second communication channel, specifically, the reply instruction is returned to the management system through the second communication channel, so that the reply instruction of the unmanned vehicle terminal may be obtained by the operator through the interaction interface of the management system. There is a persistent connection state with a unidirectional certificate between the second communication channel and the unmanned vehicle terminal, and the persistent connection state may be closed, therefore the second communication channel is not a keep-alive state. When the persistent connection state between the second communication channel and the unmanned vehicle terminal is closed, the reply instruction of the unmanned vehicle terminal cannot be obtained by the remote login control platform, which is conducive for the unmanned vehicle terminal to effectively control whether a third party can perform remote login.

The remote login control platform sends the login request of the operator through the first communication channel, and returns the reply instruction of the unmanned vehicle terminal through the second communication channel, where the first communication channel and the second communication are two communication channels independent to each other, and there is a persistent connection state that unidirectionally authenticated between the second communication channel and the unmanned vehicle terminal. When returning the reply instruction to the remote login control platform, the unmanned vehicle terminal acts as a client to check whether a certificate between the second communication channel and which is legal, the checking specifically includes: whether the certificate has expired, whether the certificate has been revoked, whether the certificate is credible, and whether a domain name in the received certificate is consistent with the requested domain name. The unmanned vehicle terminal returns the reply instruction through the second communication channel after determining that the certificate is legal, the reply instruction includes vehicle IP information of the unmanned vehicle, and the operator may log in the unmanned vehicle according to the instruction through a server after receiving the reply instruction, which achieves the remote login of the unmanned vehicle by the operator.

The present embodiment sends the login request to the unmanned vehicle terminal through the first communication channel, in response to the login request received from the operator, and waits to receive the reply instruction returned by the unmanned vehicle terminal; and returns the reply instruction to the operator through the second communication channel, in response to the reply instruction received from the unmanned vehicle terminal, so that the operator logs in the unmanned vehicle terminal according to the reply instruction, where there is the persistent connection state that unidirectionally authenticated between the second communication channel and the unmanned vehicle terminal. The remote login control platform sends the login request of the operator to the unmanned vehicle terminal through the first communication channel, and returns the reply instruction of the unmanned vehicle terminal through the second communication channel, where there is the persistent connection state that unidirectionally authenticated between the second communication channel and the unmanned vehicle terminal. For the unmanned vehicle terminal, the second communication channel is a safe and reliable channel, which may return the reply instruction including the vehicle IP address information through the second communication channel; the operator may log in the unmanned vehicle terminal through the server according to the reply instruction, which achieves the remote login o the unmanned vehicle by the operator. Since the vehicle IP address of the unmanned vehicle may be determined without complicated technologies, and it is not necessary to determine the location of the unmanned vehicle in the network, time for the remote login of the unmanned vehicle is short, and the login procedure is simple, which is conducive to reduce time and economic costs for checking the failure of the unmanned vehicle, and is conducive to ensure a safe driving of the unmanned vehicle.

Figure 2A:
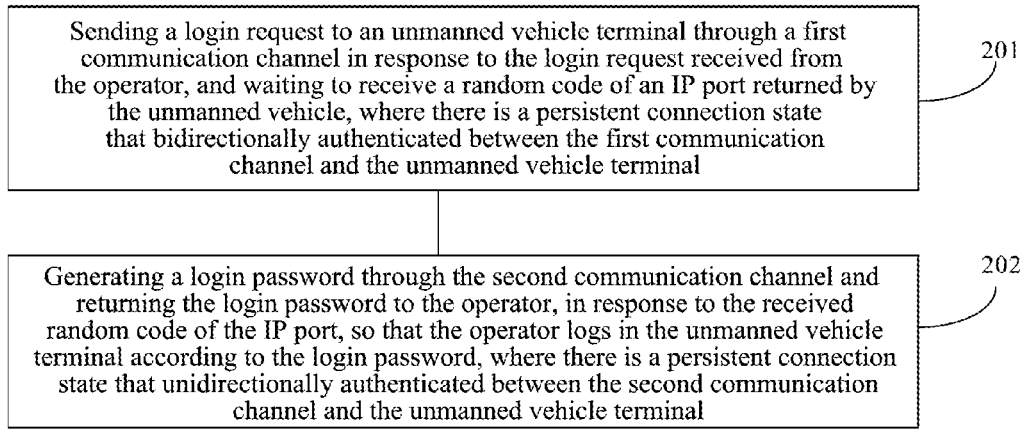
FIG. 2a is a schematic flowchart of another remote login processing method for an unmanned vehicle provided by another embodiment of the present disclosure.

FIG. 2a is a schematic flowchart of another remote login processing method for an unmanned vehicle provided by an embodiment of the present disclosure, as shown in FIG. 2a, the operations include:

step 201, sending a login request to an unmanned vehicle terminal through a first communication channel in response to the login request received from the operator, and waiting to receive a random code of an IP port returned by the unmanned vehicle and waiting to receive a reply instruction returned by the unmanned vehicle terminal, where there is a persistent connection state that bidirectionally authenticated between the first communication channel and the unmanned vehicle terminal.

In the present embodiment, specifically, the login request of the operator may be received with a management system of the remote login control platform, the login request includes vehicle ID information of the unmanned vehicle that requested by the operator to log in. The login request is sent to the unmanned vehicle terminal through a first relay unit in response to the login request received from the operator, where there is a persistent connection state that bidirectionally authenticated between the first relay unit and the unmanned vehicle terminal, and the persistent connection state keeps open.

When the first relay unit sends the login request to the unmanned vehicle terminal, a bidirectional certificate is performed between the first relay unit and the unmanned vehicle terminal, and the unmanned vehicle terminal acts as a server to check whether a certificate between the first relay unit and the unmanned vehicle terminal is legal, the checking specifically includes: whether the certificate has expired, whether the certificate has been revoked, whether the certificate is credible, and whether a domain name in the received certificate is consistent with the requested domain name as. The unmanned vehicle terminal responds to the first relay unit when determined that the certificate is legal, the handshake stops, the unmanned vehicle terminal builds a communication connection with the first relay unit and performs a symmetric encrypted data transmission. The unmanned vehicle terminal checks the certificate between the first relay unit and the unmanned vehicle terminal before receiving the login request, and receives the login request sent by the first relay unit after determining the certificate is legal, which may ensure that the received login request is safe data that has been authenticated. The persistent connection state between the unmanned vehicle terminal and the first relay unit keeps open, then the unmanned vehicle terminal may receive the login request sent by the first relay unit after the authentication of the unmanned vehicle terminal is passed. Since the login request does not include the IP address information of the unmanned vehicle, which belongs information with a low security level, keeping the persistent connection state open may enable the unmanned vehicle terminal to obtain the login request of the operator timely, which is conducive to improve remote login efficiency of the unmanned vehicle.

Figure 2B:
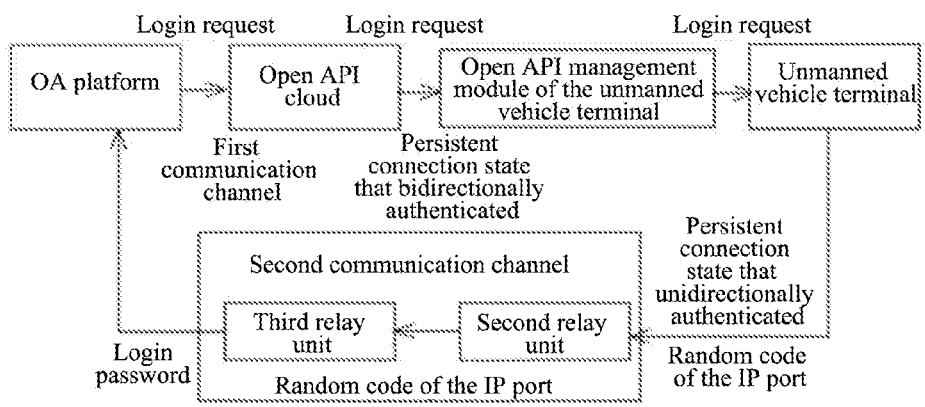
FIG. 2b is a schematic diagram of a remote login process for unmanned vehicles provided by the present embodiment.

Exemplary, FIG. 2b is a schematic diagram of a remote login process for unmanned vehicles provided by the present embodiment, as shown in FIG. 2b, the first relay unit is an Open API cloud, the operator sends the login request through an interaction interface of an OA platform (a management platform) in the remote login control platform, and the OA platform sends the received login request to an Open API management module of the unmanned vehicle through the Open API cloud, there is the persistent connection state with a bidirectional certificate between the Open API management module and the Open API cloud, and the persistent connection state keeps open. The Open API management module acts as a processor to check whether the certificate between the Open API cloud and the Open API management module is legal, and receives the login request sent by the Open API cloud after determining the certificate is legal, then sends the login request to the unmanned vehicle terminal, the Open API management module and the unmanned vehicle terminal belong to an unmanned vehicle system, and the communication between the Open API management module and the unmanned vehicle terminal is an internal communication of the unmanned vehicle system, which does not need to be authenticated.

Step 202, generating a login password through the second communication channel and returning the login password to the operator, in response to the received random code of the IP port, so that the operator logs in the unmanned vehicle terminal according to the login password, where there is a persistent connection state that unidirectionally authenticated between the second communication channel and the unmanned vehicle terminal.

In the present embodiment, specifically, the unmanned vehicle terminal determines whether the received login request is a legal request after receiving the login request, for example, determining whether the operator sending the login request has a login permission, whether the received login request is a safe and reliable request and the like. The unmanned vehicle and waiting to receive a reply instruction returned by the unmanned vehicle terminal returns the random code of the IP port to the remote login control platform after determining the received login request is a legal request.

Specifically, the unmanned vehicle terminal returns the random code of the IP port to a second relay unit of the remote login control platform, there is a persistent connection state that unidirectionally authenticated between the second relay unit and the unmanned vehicle terminal, and the unmanned vehicle acts as a client to check whether the certificate between the second relay unit and the unmanned vehicle terminal is legal before returning the random code of the IP port to the second relay unit, and the unmanned vehicle terminal returns the random code of the IP port to the second relay unit after determining that the certificate between the second relay unit and the unmanned vehicle terminal is a legal certificate. Since the unmanned vehicle has checked the legitimacy of the certificate before returning the random code of the IP port, the second relay unit is determined to be a legal and reliable server, which is conducive to effectively ensure the security of the data transmission. Due to the second relay unit of the remote control platform may be used to receive the random code of the IP port of different unmanned vehicle terminals, the second relay unit does not need to authenticate the unmanned vehicle terminal, and there is a unidirectionally authenticated between the second relay unit and the unmanned vehicle terminal.

The persistent connection state between the second relay unit and the unmanned vehicle terminal includes a persistent connection open state and a persistent connection close state, when there is a persistent connection open state between the second relay unit and the unmanned vehicle terminal, the unmanned vehicle terminal may return the random code of the IP port to the second relay unit. However, the persistent connection state between the second relay unit and the unmanned vehicle terminal may be closed, and when the persistent connection state between the second relay unit and the unmanned vehicle terminal is closed, the unmanned vehicle terminal will not return the random code of the IP port to the second relay unit, and the operator cannot perform remote login operations of the unmanned vehicle. The second relay unit may be determined to be a reliable relay platform to the unmanned vehicle terminal according to a certificate validity check in combination with the persistent connection state that may be selectively closed.

The second relay unit determines the IP address of the unmanned vehicle according to the random code of IP port after obtaining the random code of the IP port of the unmanned vehicle terminal, and sends the random code of the IP port and the determined IP address to a third relay unit, the second relay unit and the third relay unit are internal units in the remote login control platform, and the communication between them is internal communication that does not require to perform certificate authentication. The third relay unit generates, according to the random code of the IP port and the IP address, a random password, and returns the random password to the management system as the login password, the operator obtains the login password through the interaction interface of the management system, then performs the remote login operation of the unmanned vehicle according to the obtained login password, so that the remote login of the unmanned vehicle with random IP address may be realized. Due to the IP address of the unmanned vehicle is random, the random code determined by utilizing the random code of the IP port and the IP address is a one-time login password, when the random code has been used to log in by the operator, this random code may not be used to log in next time. When the operator needs to remotely log in the unmanned vehicle again, the login request needs to be resent, and the unmanned vehicle terminal resends, according to the received login request, the random code of the IP port for generating the login password.

The random code of the IP port returned by the unmanned vehicle terminal has an effective time limit, when time falls out of the effective time limit, the login password generated according to the random code of the IP port is an invalid password, and the operator cannot perform the remote login operation of the unmanned vehicle according to the login password, the unmanned vehicle terminal may effectively control the remote login operation of the operator, which is conducive to ensure security and controllability of the remote login of the unmanned vehicle, as well as a safe running of the unmanned vehicle.

The present embodiment sends the login request to the unmanned vehicle terminal through the first communication channel in response to the login request received from the operator, and waits to receive the random code of the IP port returned by the unmanned vehicle terminal, where there is the persistent connection state that bidirectionally authenticated between the first communication channel and the unmanned vehicle terminal; generates the login password through the second communication channel and returns the login password to the operator in response to the received random code of the IP port, so that the operator may log in the unmanned vehicle terminal according to the login password, where there is the persistent connection state that unidirectionally authenticated between the second communication channel and the unmanned vehicle terminal. There is the persistent connection state that bidirectionally authenticated between the first communication channel and the unmanned vehicle terminal, the unmanned vehicle terminal act as a processor to check whether the certificate between the first communication channel and the unmanned vehicle terminal is legal when transmitting the login request, and receives the login request sent by the first communication channel after determining the certificate is legal; sending the login request by utilizing the safe and reliable first communication channel that has passed the authentication may effectively ensure the security of the remote login of the unmanned vehicle, and the persistent connection state between the unmanned vehicle terminal and the first relay unit keeps open, which is conducive to improve the efficiency of remote login of the unmanned vehicle; there is the persistent connection state that unidirectionally authenticated between the second communication channel and the unmanned vehicle terminal, when the unmanned vehicle terminal acts as a client to check whether the certificate between the second communication channel and the unmanned vehicle terminal is legal when returning the random code of the IP port, and returns the random code of the IP port to the second communication channel after determining the certificate is legal, which may effectively ensure the security of the data transmission for remote login of the unmanned vehicle; the second communication channel determines the vehicle IP address of the unmanned vehicle according to the random code of the IP port, the determining of the vehicle IP address of the unmanned vehicle without utilizing complicated technologies may be realized, which is conducive to reduce the technical difficulties and the economic cost for remote login of the unmanned vehicle, and to promote the remote login technology of the unmanned vehicle; the time for remote login of unmanned vehicles is short and the login procedure is simple, which is conducive to reduce the time and economic costs for checking the failure of the unmanned vehicles, and to ensure the safe operation of the unmanned vehicles; a high safety factor for the remote login of the unmanned vehicle can effectively ensure the safety and controllability of the remote login of the unmanned vehicle, which is conducive to the promotion and application of the remote login technology of the unmanned vehicle.

Figure 3:
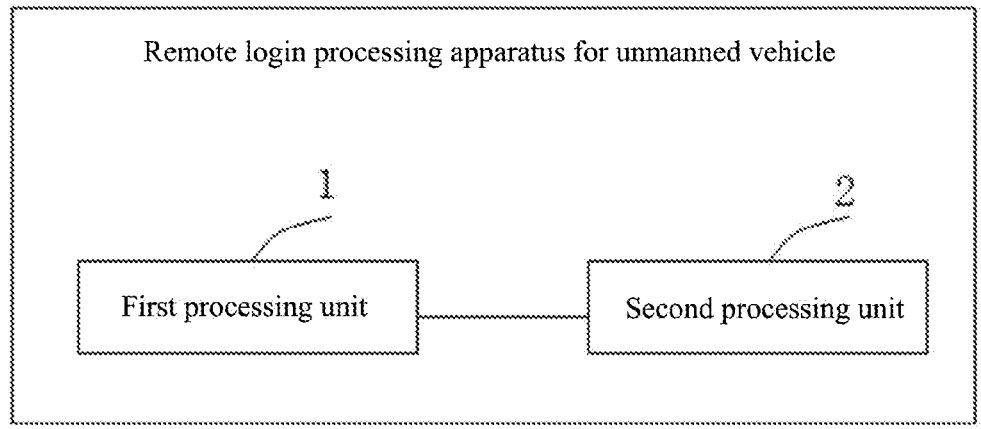
FIG. 3 is a schematic structural diagram of a remote login processing apparatus for an unmanned vehicle provided by an embodiment of the present disclosure.

FIG. 3 is a schematic structural diagram of a remote login processing apparatus for an unmanned vehicle provided by an embodiment of the present disclosure, as shown in the FIG. 3, the apparatus includes:

a first processing unit 1, configured to send login request to an unmanned vehicle terminal through a first communication channel in response to the login request received from an operator, and wait to receive reply instruction returned by the unmanned vehicle terminal;

a second processing unit 2, configured to return the reply instruction to the operator through a second communication channel in response to the reply instruction received from the unmanned vehicle terminal, so that the operator may log in the unmanned vehicle terminal according to the reply instruction, where there is a persistent connection state that unidirectionally authenticated between the second communication channel and the unmanned vehicle terminal.

The present embodiment sends the login request to the unmanned vehicle terminal through the first communication channel, in response to the login request received from the operator, and waits to receive the reply instruction returned by the unmanned vehicle terminal; and returns the reply instruction to the operator through the second communication channel, in response to the reply instruction received from the unmanned vehicle terminal, so that the operator logs in the unmanned vehicle terminal according to the reply instruction, where there is the persistent connection state that unidirectionally authenticated between the second communication channel and the unmanned vehicle terminal. The remote login control platform sends the login request of the operator to the unmanned vehicle terminal through the first communication channel, and returns the reply instruction of the unmanned vehicle terminal through the second communication channel, where there is the persistent connection state that unidirectionally authenticated between the second communication channel and the unmanned vehicle terminal. For the unmanned vehicle terminal, the second communication channel is a safe and reliable channel, which may return the reply instruction including the vehicle IP address information through the second communication channel; the operator may log in the unmanned vehicle terminal through the server according to the reply instruction, which achieves the remote login o the unmanned vehicle by the operator. Since the vehicle IP address of the unmanned vehicle may be determined without complicated technologies, and it is not necessary to determine the location of the unmanned vehicle in the network, time for the remote login of the unmanned vehicle is short, and the login procedure is simple, which is conducive to reduce time and economic costs for checking the failure of the unmanned vehicle, and is conducive to ensure a safe driving of the unmanned vehicle.

Figure 4:
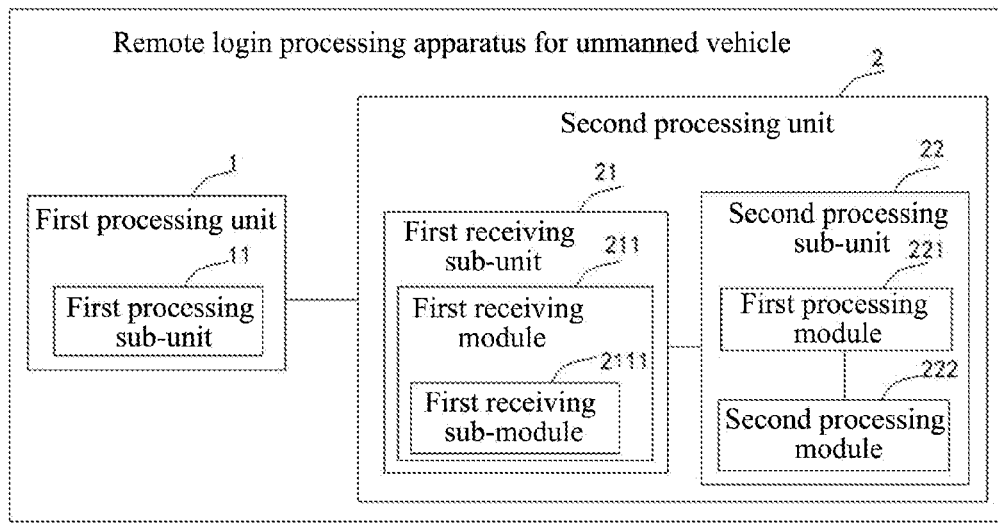
FIG. 4 is a schematic structural diagram of another remote login processing apparatus for an unmanned vehicle provided by an embodiment of the present disclosure.

FIG. 4 is a schematic structural diagram of another remote login processing apparatus for an unmanned vehicle provided by an embodiment of the present disclosure, on the basis of the embodiment illustrated by the FIG. 3, as shown in FIG. 4, the first processing unit 1 includes:

a first processing sub-unit 11, configured to send a login request to an unmanned vehicle terminal through a first relay unit in response to the login request received from the operator, where there is a persistent connection state that bidirectionally authenticated between the first relay unit and the unmanned vehicle terminal.

A persistent connection open state is kept between the first relay unit and the unmanned vehicle terminal.

The second processing unit 2 includes:

a first receiving sub-unit 21, configured to receive a random code of an Internet protocol (IP) port returned by the unmanned vehicle terminal;

a second processing sub-unit 22, configured to generate, according to the received random code of the IP port, a login password through the second communication channel and return the login password to an operator.

The first receiving sub-unit 21 includes:

a first receiving module 211, configured to receive the random code of the IP port returned by the unmanned vehicle terminal through a second relay unit, where there is a persistent connection state that unidirectionally authenticated between the second communication channel and the unmanned vehicle terminal;

the second processing sub-unit 22 includes:

a first processing module 221, configured to determine, according to the received random code of the IP port, an IP address of the unmanned vehicle terminal through a second relay unit and send the random code of the IP port and the IP address of the unmanned vehicle terminal to a third relay unit through the second relay unit;

a second processing module 222, the third relay unit is provided in the second processing module, the third relay unit generate a random code according to the received random code of the IP port and the IP address of the unmanned vehicle terminal, and returns the random code to the operator as the login password.

The persistent connection state between the second relay unit and the unmanned vehicle terminal includes a persistent connection open state and a persistent connection close state, the first receiving module 211 includes:

a first receiving sub-module 2111, configured to receive the random code of the IP port returned by the unmanned vehicle terminal through the second relay unit when there is the persistent connection open state between the second relay unit and the unmanned vehicle terminal.

The present embodiment sends the login request to the unmanned vehicle terminal through the first communication channel in response to the login request received from the operator, and waits to receive the random code of the IP port returned by the unmanned vehicle terminal, where there is the persistent connection state that bidirectionally authenticated between the first communication channel and the unmanned vehicle terminal; generates the login password through the second communication channel and returns the login password to the operator in response to the received random code of the IP port, so that the operator may log in the unmanned vehicle terminal according to the login password, where there is the persistent connection state that unidirectionally authenticated between the second communication channel and the unmanned vehicle terminal. There is the persistent connection state that bidirectionally authenticated between the first communication channel and the unmanned vehicle terminal, the unmanned vehicle terminal act as a processor to check whether the certificate between the first communication channel and the unmanned vehicle terminal is legal when transmitting the login request, and receives the login request sent by the first communication channel after determining the certificate is legal; sending the login request by utilizing the safe and reliable first communication channel that has passed the authentication may effectively ensure the security of the remote login of the unmanned vehicle, and the persistent connection state between the unmanned vehicle terminal and the first relay unit keeps open, which is conducive to improve the efficiency of remote login of the unmanned vehicle; there is the persistent connection state that unidirectionally authenticated between the second communication channel and the unmanned vehicle terminal, when the unmanned vehicle terminal acts as a client to check whether the certificate between the second communication channel and the unmanned vehicle terminal is legal when returning the random code of the IP port, and returns the random code of the IP port to the second communication channel after determining the certificate is legal, which may effectively ensure the security of the data transmission for remote login of the unmanned vehicle; the second communication channel determines the vehicle IP address of the unmanned vehicle according to the random code of the IP port, the determining of the vehicle IP address of the unmanned vehicle without utilizing complicated technologies may be realized, which is conducive to reduce the technical difficulties and the economic cost for remote login of the unmanned vehicle, and to promote the remote login technology of the unmanned vehicle; the time for remote login of unmanned vehicles is short and the login procedure is simple, which is conducive to reduce the time and economic costs for checking the failure of the unmanned vehicles, and to ensure the safe operation of the unmanned vehicles; a high safety factor for the remote login of the unmanned vehicle can effectively ensure the safety and controllability of the remote login of the unmanned vehicle, which is conducive to the promotion and application of the remote login technology of the unmanned vehicle.

Figure 5:
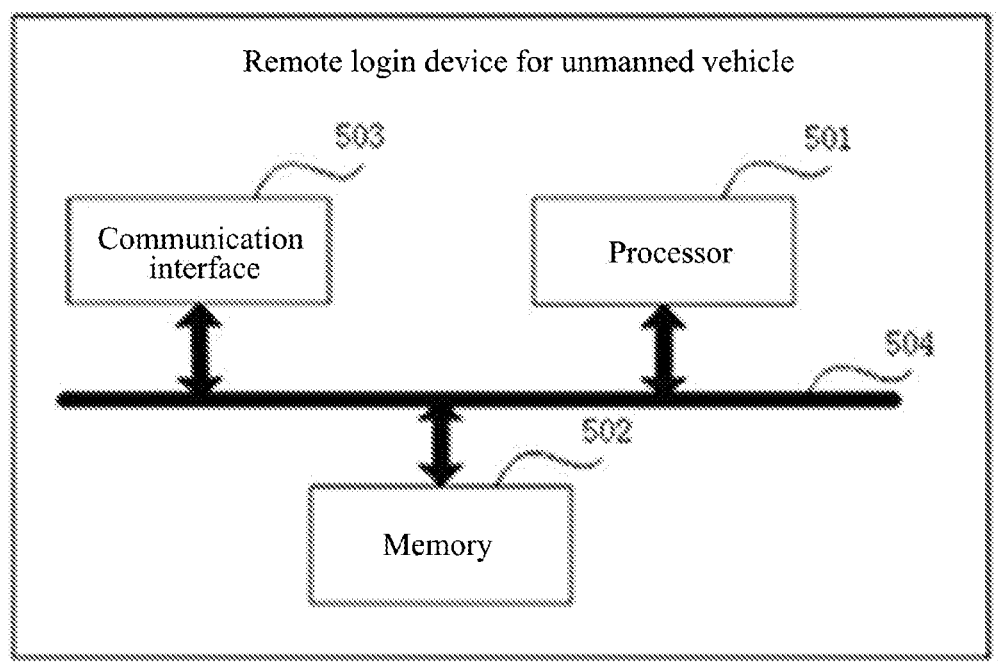
FIG. 5 is a schematic structural diagram of a remote login processing device for an unmanned vehicle provided by an embodiment of the present disclosure.

FIG. 5 is a schematic structural diagram of a remote login processing device for un unmanned vehicle provided by an embodiment of the present disclosure, as shown in the FIG. 5, the remote login processing device of unmanned vehicles provided by the embodiment of the present disclosure may be applied for executing actions and steps of the remote login processing device of the unmanned vehicle shown in FIG. 1 to FIG. 2a, which specifically includes a processor 501, a memory 502 and a communication interface 503.

The memory 502, configured to store a computer program.

The processor 501, configured to execute the computer program stored in the memory 502, and to implement actions of the remote login processing device for unmanned vehicles in the embodiments shown in FIG. 1 to FIG. 4, which is not repeated herein.

In an embodiment, the remote login processing device further includes a bus 504. The processor 501, the memory 502 and the communication interface 503 can be connected to each other through the bus 504; the bus 504 may be a Peripheral Component Interconnect (PCI) bus or an Extended Industry Standard Architecture (EISA) bus and the like. The foregoing bus 504 may be divided into address bus, data bus, control bus and the like. For ease of representation, only one thick line is used to represent in FIG. 5, but it does not mean that there is only one bus or one type of bus.

In the embodiments of the present disclosure, the foregoing embodiments may refer to each other, and the identical or similar steps and nouns are not repeated one by one.

Alternatively, part or all of the above modules may also be implemented by embedding on a certain chip of the remote login processing device for un unmanned vehicle in the form of an integrated circuit. And they can be implemented separately or integrated together. That is, the above modules can be configured to be one or more integrated circuits to implement the above method, for example: one or more application specific integrated circuits (ASICs), or one or more digital signal processor (DSPs), or one or more field programmable gate array (FPGAs).

A computer-readable storage medium, which stores a computer program, the computer program is executed by a processor to implement the processing method described above.

In the above embodiments, it may be implemented in whole or in part by software, hardware, firmware or any combination thereof. When implemented in software, it may be implemented in whole or in part in the form of a computer program product. The computer program product includes one or more computer instructions. When the computer program instructions are loaded and executed on a computer, the processes or functions according to the embodiments of the present disclosure are wholly or partially generated. The computer may be a general purpose computer, a special purpose computer, a computer network, or other programmable apparatus. The computer instructions may be stored in or transmitted from one computer-readable storage medium to another computer-readable storage medium, for example, the computer instructions may be transmitted from a web site, computer, automated service equipment, or data center via a cable (for example, coaxial cable, optical fiber, digital subscriber line (DSL)) or wireless (for example, infrared, wireless, microwave, etc.) to another website site, computer, automatic service equipment or data center. The computer-readable storage medium may be any available medium that can be accessed by a computer, or a data storage device such as an automatic service device, a data center, or the like that includes one or more available medium integration. The usable medium may be a magnetic medium (for example, a floppy disk, a hard disk, a magnetic tape), an optical medium (for example, a DVD), or a semiconductor medium (for example, a solid state disk (SSD)), and the like.

Those skilled in the art should be aware that, in one or more of the above examples, the functions described in the embodiments of the present disclosure may be implemented by hardware, software, firmware, or any combination thereof. When implemented in software, the functions may be stored on a computer-readable medium or transmitted as one or more instructions or code on the computer-readable medium. The computer-readable media includes computer storage media and communication media, which includes any medium that facilitates transfer of the computer program from one place to another. The storage media may be any available media that can be accessed by a general purpose or special purpose computer.

Those skilled in the art will readily contemplate other embodiments of the present disclosure after considering the specification and practicing the invention disclosed herein. The present disclosure is intended to cover any variation, use, or adaptive change of the present disclosure, and these variations, uses, or adaptive changes follow the general principles of the present disclosure and include common general knowledge or conventional technical means in the technical field that not disclosed by the present disclosure. It is intended that the specification and examples be considered as exemplary only, with a true scope and spirit of the disclosure being indicated by the following claims.

It should be understood that the present disclosure is not limited to the precise structure that has been described above and illustrated in the accompanying drawings, and various modifications and changes can be made without departing from the scope thereof. The scope of this disclosure is limited only by the following claims.

What is claimed is:

1. A remote login processing method for an unmanned vehicle, wherein the method is applied to a remote login control platform, comprises:
sending a login request to an unmanned vehicle terminal through a first communication channel in response to the login request received from an operator, and waiting to receive a reply instruction returned by the unmanned vehicle terminal; and
returning the reply instruction to the operator through a second communication channel in response to the reply instruction received from the unmanned vehicle terminal, so that the operator logs in the unmanned vehicle terminal according to the reply instruction, wherein there is a persistent connection state that unidirectionally authenticated between the second communication channel and the unmanned vehicle terminal;
wherein the waiting to receive the reply instruction returned by the unmanned vehicle terminal, comprises:
waiting to receive a random code of an internet protocol (IP) port returned by the unmanned vehicle terminal;
wherein the returning the reply instruction to the operator through the second communication channel in response to the reply instruction received from the unmanned vehicle terminal, comprises:
generating, according to the received random code of the IP port, a login password through the second communication channel and returning the login password to the operator.

2. The method according to claim 1, wherein the sending a login request to an unmanned vehicle terminal through a first communication channel in response to the login request received from an operator, comprises:

sending the login request to the unmanned vehicle terminal through a first relay unit in response to the login request received from the operator, wherein there is the persistent connection state that bidirectionally authenticated between the first relay unit and the unmanned vehicle terminal.

3. The method according to claim 2, wherein a persistent connection open state is kept between the first relay unit and the unmanned vehicle terminal.

4. The method according to claim 1, wherein receiving the random code of the IP port that returned by the unmanned vehicle terminal, comprises:

receiving the random code of the IP port returned by the unmanned vehicle terminal through a second relay unit, wherein there is a persistent connection state that unidirectionally authenticated between the second relay unit and the unmanned vehicle terminal;

the generating, according to the received random code of the IP port, a login password through the second communication channel and returning the login password to the operator, comprises:

determining, according to the received random code of the IP port, an IP address of the unmanned vehicle terminal through the second relay unit and sending the random code of the IP port and the IP address of the unmanned vehicle terminal to a third relay unit through the second relay unit;

generating, by the third relay unit, a random code according to the random code of the IP port and the IP address of the unmanned vehicle terminal and returning the random code to the operator as the login password.

5. The method according to claim 4, wherein the persistent connection state between the second relay unit and the unmanned vehicle terminal comprises a persistent connection open state and a persistent connection close state, the receiving the random code of the IP port returned by the unmanned vehicle terminal through a second relay unit, comprises:

receiving the random code of the IP port returned by the unmanned vehicle terminal through the second relay unit when there is a persistent connection open state between the second relay unit and the unmanned vehicle terminal.

6. The method according claim 1, wherein the reply instruction returned by the unmanned vehicle terminal has an effective time limit, when time falls out of the effective time limit of the reply instruction, the operator cannot log in the unmanned vehicle terminal according to the reply instruction.

7. A remote login processing apparatus for an unmanned vehicle, comprising:

at least one processor; and a memory communicatively connected to the at least one processor; wherein, the memory stores an instruction executable by the at least one processor, so that the at least one processor executes the instruction to perform the following steps:

sending a login request to an unmanned vehicle terminal through a first communication channel in response to the login request received from an operator, and waiting to receive a reply instruction returned by the unmanned vehicle terminal;

returning the reply instruction to the operator through a second communication channel in response to the reply instruction received from the unmanned vehicle terminal, so that the operator logs in the unmanned vehicle terminal according to the reply instruction, wherein there is a persistent connection state that unidirectionally authenticated between the second communication channel and the unmanned vehicle terminal;

wherein the at least one processor executes the instruction to perform the following steps:

receiving a random code of an internet protocol (IP) port returned by the unmanned vehicle terminal;

generating, according to the received random code of the IP port, a login password through the second communication channel and returning the login password to an operator.

8. The apparatus according to claim 7, wherein the at least one processor executes the instruction to perform the following step:

sending the login request to the unmanned vehicle terminal through a first relay unit in response to the login request received from the operator, wherein there is the persistent connection state that bidirectionally authenticated between the first relay unit and the unmanned vehicle terminal.

9. The apparatus according to claim 8, wherein a persistent connection open state is kept between the first relay unit and the unmanned vehicle terminal.

10. The apparatus according to claim 7, wherein the at least one processor executes the instruction to perform the following steps:

receiving the random code of the IP port returned by the unmanned vehicle terminal through a second relay unit, where there is a persistent connection state that unidirectionally authenticated between the second relay unit and the unmanned vehicle terminal;

determining, according to the received random code of the IP port, an IP address of the unmanned vehicle terminal through the second relay unit and sending the random code of the IP port and the IP address of the unmanned vehicle terminal to a third relay unit through the second relay unit;

generating a random code according to the received random code of the IP port and the IP address of the unmanned vehicle terminal, and returning the random code to the operator as the login password.

11. The apparatus according to claim 10, wherein the persistent connection state between the second relay unit and the unmanned vehicle terminal comprises a persistent connection open state and a persistent connection close state, wherein the at least one processor executes the instruction to perform the following step:

receiving the random code of the IP port returned by the unmanned vehicle terminal through the second relay unit when there is the persistent connection open state between the second relay unit and the unmanned vehicle terminal.

12. A non-transitory computer-readable storage medium that stores a computer instruction, the computer instruction is configured to enable the computer to perform the following steps:

sending a login request to an unmanned vehicle terminal through a first communication channel in response to the login request received from an operator, and waiting to receive a reply instruction returned by the unmanned vehicle terminal;

returning the reply instruction to the operator through a second communication channel in response to the reply instruction received from the unmanned vehicle terminal, so that the operator logs in the unmanned vehicle terminal according to the reply instruction, wherein there is a persistent connection state that unidirectionally authenticated between the second communication channel and the unmanned vehicle terminal;

wherein the computer instruction is configured to enable the computer to perform the following steps:

receiving a random code of an internet protocol (IP) port returned by the unmanned vehicle terminal;

generating, according to the received random code of the IP port, a login password through the second communication channel and returning the login password to an operator.

13. The non-transitory computer-readable storage medium according to claim 12, wherein the computer instruction is configured to enable the computer to perform the following step:

sending the login request to the unmanned vehicle terminal through a first relay unit in response to the login request received from the operator, wherein there is the persistent connection state that bidirectionally authenticated between the first relay unit and the unmanned vehicle terminal.

14. The non-transitory computer-readable storage medium according to claim 13, wherein a persistent connection open state is kept between the first relay unit and the unmanned vehicle terminal.

15. The non-transitory computer-readable storage medium according to claim 12, wherein the computer instruction is configured to enable the computer to perform the following steps:

receiving the random code of the IP port returned by the unmanned vehicle terminal through a second relay unit, where there is a persistent connection state that unidirectionally authenticated between the second relay unit and the unmanned vehicle terminal;

determining, according to the received random code of the IP port, an IP address of the unmanned vehicle terminal through the second relay unit and sending the random code of the IP port and the IP address of the unmanned vehicle terminal to a third relay unit through the second relay unit;

generating a random code according to the received random code of the IP port and the IP address of the unmanned vehicle terminal, and returning the random code to the operator as the login password.

16. The non-transitory computer-readable storage medium according to claim 15, wherein the persistent connection state between the second relay unit and the unmanned vehicle terminal comprises a persistent connection open state and a persistent connection close state, wherein the computer instruction is configured to enable the computer to perform the following step:

receiving the random code of the IP port returned by the unmanned vehicle terminal through the second relay unit when there is the persistent connection open state between the second relay unit and the unmanned vehicle terminal.

17. The non-transitory computer-readable storage medium according to claim 15, wherein the reply instruction returned by the unmanned vehicle terminal has an effective time limit, when time falls out of the effective time limit of the reply instruction, the operator cannot log in the unmanned vehicle terminal according to the reply instruction.

* * * * *